May 21, 1929. O. L. PRIME 1,714,135
WINDSHIELD
Filed Dec. 21, 1927
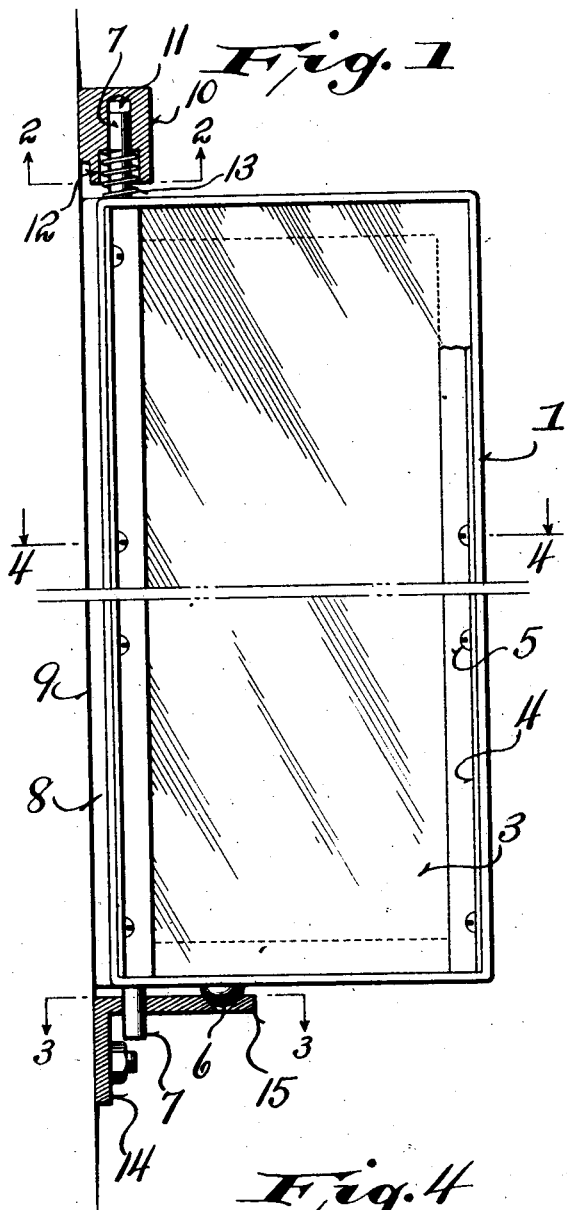
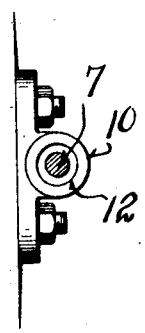
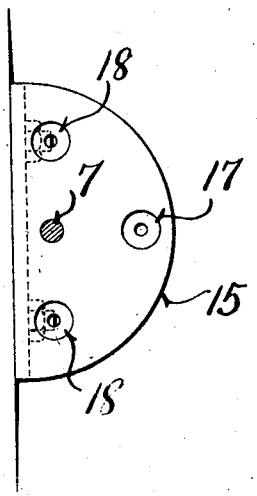
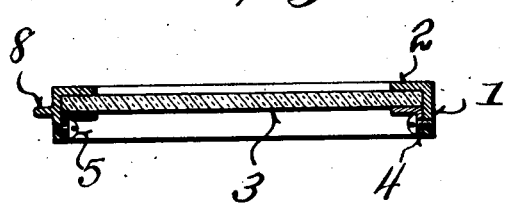
Inventor:
Orton L. Prime Patented May 21, 1929.

1,714,135

UNITED STATES PATENT OFFICE.

ORTON L. PRIME, OF MILWAUKEE, WISCONSIN.

WINDSHIELD.

Application filed December 21, 1927. Serial No. 241,677.

This invention relates to windshields.

In locomotive practice, it has been the custom heretofore to provide windshields adjacent the cab windows so arranged that the windshield could be positively locked in place, but these devices were usually secured by means of hooks and eyes or similar fasteners. They had the serious defect of requiring considerable manipulation before they could be adjusted to a new position, and also when the engine was running into the round house, they were frequently broken, due to the small amount of clearance allowed the engine.

This invention is designed to overcome the defects noted above and objects of such invention are to provide a novel form of windshield particularly adapted for a locomotive or similar vehicle and so constructed that it may be readily adjusted by a simple operation, such for example, as merely pushing it into the desired position and which also is so mounted that the windshield can not be broken when the engine goes into the round house and the windshield is struck by a projecting portion of such round house, as the mounting permits the rocking of the windshield and does not allow it to be snapped off as heretofore.

Further objects are to provide a novel form of windshield which is extremely rugged in construction, which protects the glass from mechanical damage, which may be cheaply made, and which is of the utmost simplicity.

An embodiment of the invention is shown in the accompanying drawings in which:—

Figure 1 is a side elevation showing the supporting parts in section;

Figure 2 is a sectional view on the line 2—2 of Figure 1;

Figure 3 is a sectional view on the line 3—3 of Figure 1;

Figure 4 is a sectional view on the line 4—4 of Figure 1.

Referring to the drawings, it will be seen that the windshield comprises a metallic frame 1 which is preferably cast integral throughout. This frame is provided with an inturned flange 2 against which the glass 3 is positioned. The glass is held in place by means of the angle irons 4 which may be secured by screws 5 or similar fastening means. Obviously, any number of these angle irons may be employed, although it has been found from actual practice that two are sufficient.

The frame 1 has integrally formed thereon a lug or boss 6 which is hemispherical. It also has integral projecting trunnions 7 which extend from the top and bottom of the windshield adjacent its inner edge. Further, the windshield frame 1 has an integral web or flange 8 formed on its rear face which approximately contacts with the wall 9 of the cab.

The windshield is carried at its upper end by means of a bearing 10 which is provided with a socket 11 for the reception of the trunnion 7. It is to be noted that the upper end of this socket is closed to prevent the entrance of water and subsequent freezing. Further, the trunnion 7 is spaced a slight distance from the upper end of the socket to permit upward motion of the windshield, as hereinafter described. The socket is further provided with an enlarged bore 12 in which a helical spring 13 is seated, the spring bearing at one end against the member 10 and at the other end against the top of the windshield and urging it yieldingly downwardly.

The lower bearing member consists of a bracket having a leg 14 bolted to the wall of the cab and having a projecting semi-circular member or plate 15. This plate is provided with a plurality of conical depressions or openings which may be arranged, as shown in Figure 3. For instance, there may be a central depression 17 and a front and rear depression 18.

In using the windshield, it is merely necessary to catch the outer edge thereof and rock it into the desired position. For example, when it is not in use, it may be rocked parallel to the plane of the cab wall, the projections 6 seating within one of the depressions 18. When it is desired to use the windshield, it can be readily rocked into its right angle position with the projections 6 socketed within the depression 17. It is to be noted that the projection can be moved from the sockets in which it is received by a reasonable amount of pressure exerted upon the windshield frame. This permits ready adjustment and, in addition, avoids breaking of the windshield in case the engine is run into the round house without rocking the windshield into inoperative position. For example, if the windshield is in its projected position and strikes an obstruction the windshield is not broken as the force of the blow is received by the metal frame and as the projection 6 freely rides out over its socket 17 and permits ready swinging of the windshield into a plane parallel to the engine cab. Further, this swinging may be either forwardly or rearwardly, depending on whether the engine is being backed into the round house or run in in the usual manner.

It will be seen that a very simple type of windshield has been provided which is eminently suited for mounting on an engine cab to give the requisite protection to the engineer and also to adequately protect the windshield itself in the event that the windshield strikes a projecting portion of the round house or other obstruction.

Further, it will be seen that the windshield is very simple and sturdy in construction and that it may be most easily adjusted to the desired position.

Although the invention has been described in considerable detail, such description is intended as illustrative rather than limiting as the invention may be variously embodied and as the scope of such invention is to be determined as claimed.

I claim:

1. A windshield comprising a frame, a transparent member carried by said frame, said frame having an upper and a lower projecting trunnion, an upper bearing receiving the upper trunnion, a lower bearing receiving the lower trunnion, said bearings permitting limited axial motion of the trunnions, a spring surrounding one of the trunnions and engaging the corresponding bearing and the windshield and resisting axial motion, the other of said bearings having a plurality of sockets formed therein, and a projection carried by the frame and adapted to seat in anyone of said sockets, the upper bearing being closed at its top to prevent the entrance of water.

2. A windshield comprising a frame, a transparent member carried by said frame, said frame having an upper and a lower projecting trunnion, an upper bearing receiving the upper trunnion, a lower bearing receiving the lower trunnion, said bearings permitting limited axial motion of the trunnions, a spring surrounding one of the trunnions and engaging the corresponding bearing and the windshield and resisting axial motion, the other of said bearings having a plurality of sockets formed therein, and a projection carried by the frame and adapted to seat in anyone of said sockets, the upper bearing being closed at its top to prevent the entrance of water, said frame having a projecting web on its inner edge adapted to approximately contact with the wall of the support to which the bearings are attached.

In testimony that I claim the foregoing I have hereunto set my hand at Milwaukee, in the county of Milwaukee and State of Wisconsin.

ORTON L. PRIME.